United States Patent [19]
Byne

[11] 3,936,944
[45] *Feb. 10, 1976

[54] LINEAR CUT SEWING TAPE

[76] Inventor: Zachary Paul Byne, 140 Eighth Ave., Brooklyn, N.Y. 11215

[ * ] Notice: The portion of the term of this patent subsequent to Mar. 19, 1991, has been disclaimed.

[22] Filed: Mar. 18, 1974

[21] Appl. No.: 452,142

Related U.S. Application Data

[63] Continuation-in-part of Ser. No. 244,562, April 7, 1972, Pat. No. 3,797,120.

[52] U.S. Cl. .................. 33/137 R; 33/111; 428/131; 428/136; 428/343
[51] Int. Cl.² .......................................... G01B 3/10
[58] Field of Search ........... 161/406, 109, 167, 105, 161/145; 156/304, 251, 291; 33/111, 137, 174; 428/152, 154, 131, 136, 343

[56] References Cited
UNITED STATES PATENTS

| | | | |
|---|---|---|---|
| 2,391,539 | 12/1945 | Avery | 40/125 A |
| 2,511,953 | 6/1950 | Tallman | 40/125 A |
| 2,805,485 | 9/1957 | Krummel | 33/174 |
| 2,885,138 | 5/1959 | Brackett et al. | 161/135 |
| 2,932,897 | 4/1960 | Huber | 206/459 |
| 3,797,120 | 3/1974 | Byne | 33/75 |

Primary Examiner—George F. Lesmes
Assistant Examiner—R. J. Roche

[57] ABSTRACT

A sewing tape especially adapted to provide a measured sewing guide line when using a sewing machine. The tape is in the form of a strip provided with cuts extending through the tip for separating the tape into ribbons of predetermined thickness and has suitable guide lines printed thereon some of which coincide with the cuts. The tape is held together by pressure sensitive adhesive coated on one surface of the tape which is wound under tension.

2 Claims, 5 Drawing Figures

U.S. Patent  Feb. 10, 1976  3,936,944
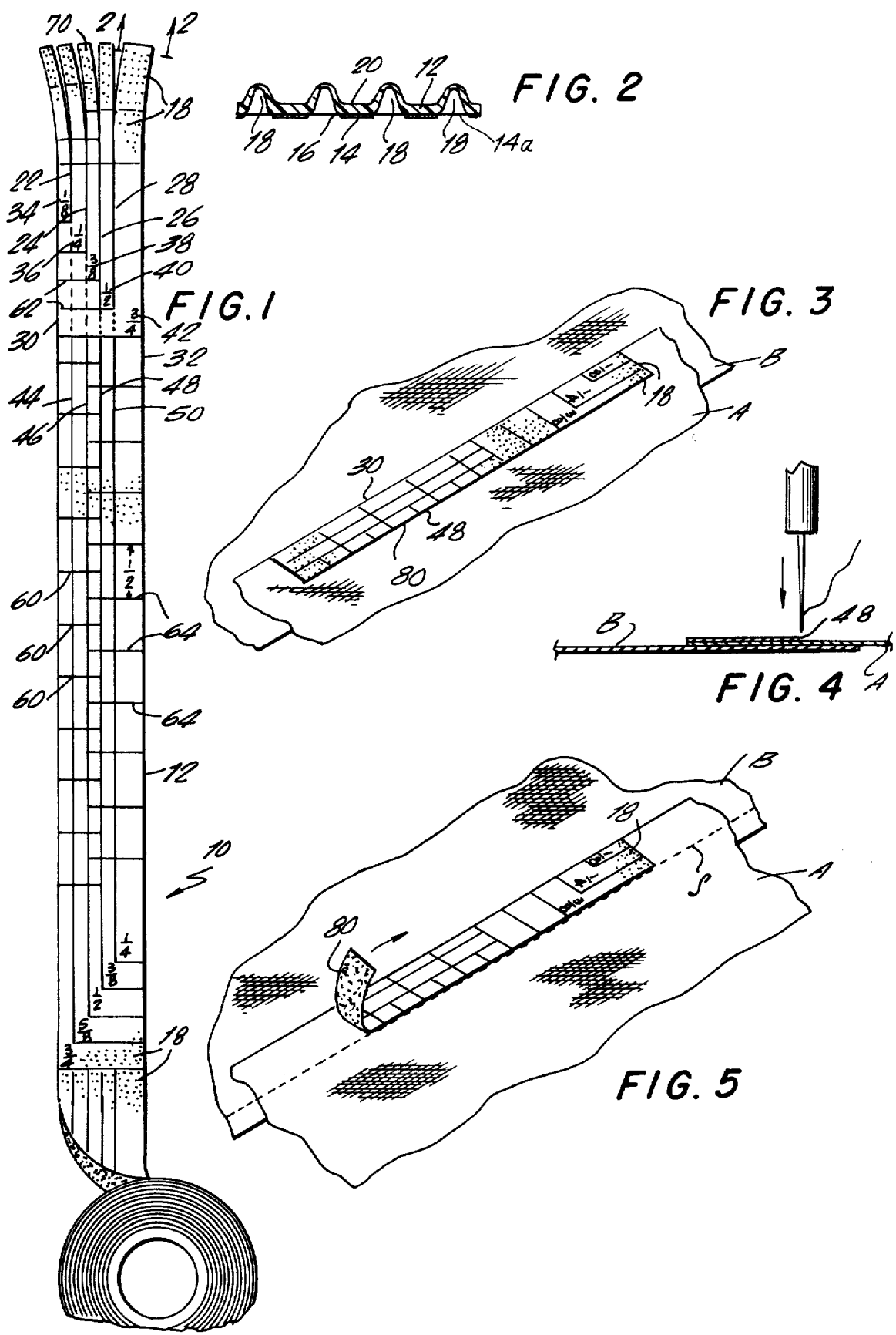

LINEAR CUT SEWING TAPE

REFERENCE TO RELATED APPLICATION

This application is a continuation-in-part and is co-pending with application Ser. No. 244,562, filed Apr. 7, 1972, for SEWING TAPE, now U.S. Pat. No. 3,797,120.

BACKGROUND OF THE INVENTION

1. Field of the Invention

This invention relates to a sewing tape for facilitating the use of sewing machines to provide for accurate top stitching.

2. Description of the Prior Art

In the use of sewing machines, even a skilled operator has difficulty in maintaining exact alignment and regularity when stitching. Heretofore various means for the alignment of the material being sewn have been utilized including pins, chalk marks, and the like, all of which are unsatisfactory. Pins cannot be used in connection with vinyls, suede, leather, and other fabrics which are damaged thereby. Chalk marks often leave difficult to clean spots on the fabric and in themselves are not wholly accurate.

SUMMARY OF THE INVENTION

It is therefore an object of the present invention to overcome the various disadvantages of the prior art alignment means while also providing a sewing tape that has numerous applications besides facilitating accurate and perfect top stitching.

It is another object of the invention to provide a sewing tape which is adapted for numerous uses including aiding zipper applications, to stabilize stretchy fabrics, baste hems, simplify pattern alterations, measure button and buttonhole placements, which is adapted to mark the right and wrong sides of fabrics, and which as adapted to be placed on a sewing machine as a stitching guideline.

The construction of this invention features a sewing tape that is fully cut through linearly to separate into ribbons of predetermined widths having accurate lines and indicia thereon which may be easily packaged in endless rolls under tension with the linear cut apart portions being held in place by a pressure sensitive adhesive coated thereon, which is adapted to be adhesively secured on a piece of fabric in a manner so as to be securely fastened thereto while being easily removable from the fabric without pulling or stretching the fabric, and which is inexpensive to manufacture in elongated strips adapted to be formed into rolls for packaging at relatively low cost thereby permitting wide use and distribution.

These, together with the various ancillary objects and features of this invention, which will become apparent as the following description proceeds, are attained by this sewing tape, a preferred embodiment of which is illustrated in the accompanying drawing, by way of example only, wherein:

FIG. 1 is a plan view of a portion of a sewing tape in accordance with the concepts of the present invention with the balance of the tape being wound under tension to form a roll;

FIG. 2 is an enlarged sectional view looking along the plane of line 2—2 in FIG. 1;

FIG. 3 is a perspective view illustrating one manner in which the tape may be used;

FIG. 4 is a sectional detail view taken transversely of the tape shown in FIG. 3 and illustrating in an enlarged scale the next step of the manner in which the tape is used for facilitating top stitching; and, FIG. 5 is a view similar to FIG. 3 after stitching has been completed.

With continuing reference to the accompanying drawing, wherein like reference numerals designate similar parts throughout the various views, reference numeral 10 is used to generally designate a sewing tape in accordance with the concepts of the present invention. This sewing tape includes an elongated strip 12 of paper or paper-like material or any other suitable flexible base material, which is provided with a coating 14 of a pressure sensitive adhesive on the lower face 16 thereof. A plurality of depressions 18 are formed in rows and project upwardly from the lower face 16 above the upper face 20 of the strip 12. These depressions 18 are imperforate forming closed air pockets which are useful for a purpose to be hereinafter disclosed. Further, the closed depressions 18 maintain their shape even after the tape has been applied on any desired fabric.

Linear cuts 22, 24, 26 and 28 are formed in and extending fully the strip 12 and extend longitudinally thereof in spaced parallel relationship to each other with the cut 22 being ⅛ inch from the edge 30 of the strip 12. The cut 24 is ¼ inch from the edge 30 and the cut 26 is ⅜ inch from the edge 30 and ⅜ inch from the edge 32 of strip 12. The cut 28 is ½ inch from the edge 30 and ¼ inch from the edge 32, the entire tape being ¾ inch in width. Accordingly, suitable indicia 34, 36, 38, 40 and 42 designate the width of the strip along the cuts 22, 24, 26 and 28 from the edge 30 and are suitably printed on the strip 12.

A plurality of lines 44, 46, 48 and 50 which closely coincide with the cuts 22, 24, 26 and 28 are printed on the strip 12 and are preferably black in color so as to stand out from the color of the strip 12, which may be of any suitable color such as yellow, white, cream or the like. These lines 44, 46, 48 and 50 provide a visual indication of the location of the cuts and when the ribbons have been separated along any of the cuts, the printed lines 44, 46, 48 and 50 provide visual graphic edging for the ribbons. The strip 12 is held together only by the pressure sensitive adhesive coating 14a which is applied simultaneously with the cutting and printing of the tape and while the tape is being wound under a tensile force in the order of 100 lbs. Pressure sensitive adhesive coating 14a extends across the fully cut through linear cuts holding the ribbon together as illustrated in FIG. 2. The formation of the indentations 18 aid in the maintenance of the ribbons in the assembled strip formed by urging the pressure sensitive adhesive across cuts.

A first plurality of transverse lines 60 are printed in spaced relation to each other any suitable distance apart and extend from the edge 30 to the line 48. Other printed lines 62 are ¼ inch apart from each other, while the printed lines 60 are located ½ inch apart from each other. In addition, transverse lines 64 are provided on the strip 12 and extend from the edge 32 to the line 46 so that the ribbon 70 is provided with the transverse lines which are ¼ inch apart.

In using the sewing tape for top stitching, it is desired to cut a length of tape 80 as needed and as shown in FIG. 3. The length 80 has been pulled apart along cut 26 to form a ribbon ⅜ inch wide. The edge 30 is placed at the seam line on the section of material A which overlies the piece of material B and the tape section 80 leaving line 48 as a stitching guideline. Then, as shown in FIGS. 4 and 5, it is possible to stitch a seam S exactly next to the stitch guideline 48. The tape may be slashed or split and wrapped around curves as may be needed. If more than one line of stitching is desired, it is possible to stitch directly through the tape preferably along one of the guidelines 44, 46, 48 and 50 so that when it is desired to remove the tape, the tape will readily pull apart along one or more of the cuts 22, 24, 26 and 28, thus allowing the tape to be easily removed without disturbing the stitching. Of course, the needle of the sewing machine must be wiped clean periodically when stitching through the tape.

Then, as shown in FIG. 5, the tape 80 may be easily removed because of the trapped air in the depressions 18. The depressions 18 facilitate the removal of the tape without disturbing the fibers of the materials because of the break in the adhesive contact of the pressure sensitive adhesive 14 with the fabric.

It is to be noted that two or more widths of tape may be combined for measurements wider than ¾ inch. The tape may be used to stabilize stretchy fabrics for stitching. The tape 10 is useful for final stitching of zippers on outsides of the garmet by use as stitching guides and to hold zippers in place inside of a garmet. The transverse lines 60, 62, and 64 are highly desireable for use as measuring guides for replacing buttons and making buttonholes and lines 60, 62 and 64 are useful for measuring and holding hems in position at the desired length. Of course, pieces of the tape may be placed on the wrong side of cut pieces before removing a pattern so that the right from wrong side of the fabric can be easily identified. The tape may be used as a machine stitching guide by suitable application on a sewing machine. The ribbons may be used as guides in any other manner as desired.

A latitude of modification, change and substitution is intended in the foregoing disclosure, and in some instances some features of the invention will be employed without a corresponding use of other features.

I claim:

1. A sewing tape comprising an elongated strip of flexible material having an upper face and a lower face, a pressure sensitive adhesive coating on said lower face, and fully cut through cuts in said strip extending longitudinally the length of said strip completely dividing said strip into ribbons of predetermined width, said strip having a plurality of imperforate depressions in the lower face and projecting upwardly of said upper face causing some of said pressure sensitive adhesive coating to extend across said cuts holding said ribbons together, a plurality of longitudinally extending lines on said upper face closely coinciding with at least some of said cuts, said lines extending parallel to each other, indicia on said upper face indicating the distance each of said lines is from an edge of said strip, a plurality of transverse lines on said tape extending normally to said strip and marking at least some of said ribbons into sections of predetermined length, some of said transverse lines extending from one edge of said strip to one of said cuts, and others of said transverse lines extending from another edge of said strip to another of said cuts.

2. A sewing tape according to claim 1, wherein said tape is wound in a roll under a tensile force of about 100 lbs.

* * * * *